June 5, 1956     J. A. BENOIT     2,748,416

WINDSHIELD WIPER WITH COMPRESSED AIR NOZZLE

Filed Dec. 9, 1953

INVENTOR.

Joseph A. Benoit

United States Patent Office 2,748,416
Patented June 5, 1956

2,748,416
WINDSHIELD WIPER WITH COMPRESSED AIR NOZZLE

Joseph A. Benoit, Vivian, La.

Application December 9, 1953, Serial No. 397,214

2 Claims. (Cl. 15—250.4)

The present invention relates to windshield wipers for automobiles or other vehicles. It is known that the employment of windshield wipers for vehicles has been used for many years to assist a driver of the vehicle when driving in the rain. The art is much and varied with inventions of this nature both in wiping the windshield glass and also in heating the glass for the prevention or removal of ice and snow. In the case of a severe rain, however, the reciprocating action of the wiper blades is never fast enough to keep a clear field of vision on the glass, the rain coming with such force and volume as to fall upon the windshield directly behind the wiper blades in its stroke in either direction, so that the wiping action does very little good.

It is an object of the present invention to combine, with the use of a conventional wiper actuating unit, the use of compressed air as a medium of repelling rain for a small area around the blade during its wiping action.

It is another object of the invention to utilize the blade and other wiper members as conduits for delivering compressed air to the windshield area.

It is a further object of the invention to provide a nozzle or valve to direct a conically-shaped stream of air at high velocity outwardly in the direction of travel of the vehicle to assist in repelling a force of rain from a small area around the wiper blades.

Other objects and advantages of the invention will become apparent in the course of the following detailed description when viewed together with the accompanying drawing in which.

Figure 1:
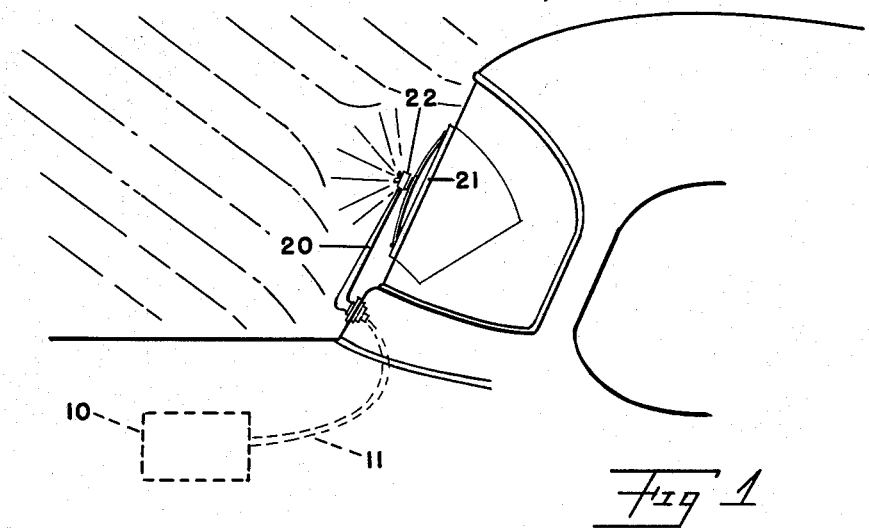
Fig. 1 is a side view of an embodiment of my invention in a windshield wiper, the same being shown mounted on an automobile.

In the drawing numeral 10 designates an air compressor driven by the engine of the vehicle. It will be understood that the air compressor is not part of the present invention and may be any of the makes or types now being used for the operation of air brakes or the like. The delivery line 11 is of flexible material and is extended beneath the hood of the vehicle and through the fire wall where it finally connects to the wiper proper.

Figures 3, 4:
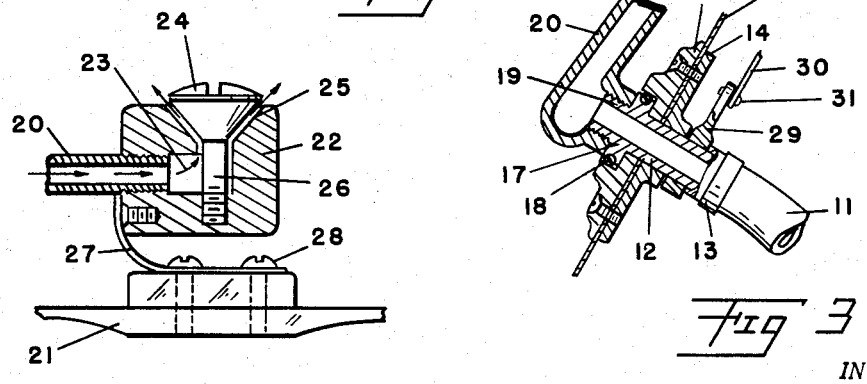
Fig. 3 is a detailed sectional view of the mode of extending the conduit through the dash panel of the automobile.
Fig. 4 is a detailed, sectional view of the nozzle or valve member of the invention.

In Fig. 3 this connection is made by clamping the delivery tube 11 over the inner end of a swivel tube 12 by means of a circular clamp 13. As shown also in this figure, the swivel tube 12 is extended through a back-up plate 14 and through the wall 15 of the vehicle and finally through an outer bearing plate 16. The swivel tube 12 is provided with an upset head portion 17 around the circumference of which I have placed a gasket 18 to prevent water from seeping through the mechanism and into the vehicle. The swivel tube 12 is also provided with an outer, threaded, stub end 19 to which the wiper arm 20 is threadedly attached. It will be noted that the wiper arm 20 is hollow and serves as a conduit bringing the compressed air thus far from the compressor 10. Rigidly affixed to the inner end of the swivel tube 12 is a rocker arm 29. Pivotally attached to the outer end of the rocker arm 29 is a push rod 30 held to the rocker arm by means of a pivot pin 31. The opposite end of the push rod 30 is attached to the conventional wiper actuating unit 32, shown in dotted lines on Fig. 2.

Fig. 4 shows the manner of attaching the end of the wiper arm 20 with the blade 21. Threadedly attached to the end of the wiper arm 20 is a valve body 22 provided with a drilled passageway 23, a valve 24 and a valve seat 25. The stem 26 of the valve is threaded on its lower end and engaged with a threaded hole provided in the bottom of the valve body 22, so that the amount of opening between the valve and seat may be adjusted. The valve body 22 is affixed to the medial portion of the wiper blade 21 by means of a metal strip and screws 28.

It will be understood that other valves or mechanisms are used to cut the compressor 10 in and out of operation or even a pet-cock or the like might be used in the delivery line to use the compressed air only when desired.

Figure 2:
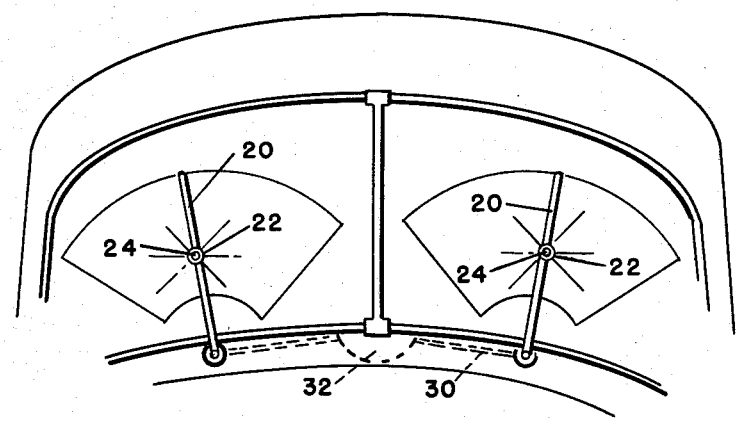
Fig. 2 is a front view of the invention as illustrated in Fig. 1.

In operation, the device is used as follows: Let it be assumed that the vehicle is being driven in a rain. The wipers would be used in the normal manner. Now let it be assumed that the vehicle is either turned into the wind or that the rain suddenly decends in such volume that the action of the wiper blades alone does not clear an area on the windshield sufficient for the driver to see. In such case, the air compressor would be employed to pump air through the delivery tube 11, through the connecting mechanism on the dash, and up through the wiper arm 20. As the compressed air leaves the valve body 22, around the conically-shaped valve 24, it is dispersed in cone-shaped fashion, and at high velocity against the driving rain. It is not intended by this invention to completely prevent water from coming against the windshield, but to keep a small area clear around the wiper blade in order that the driver may see. As the air, at high velocity, leaves the valve 24, it is dispersed against the rain and a circular area around the center of the blade and keeps a small portion of the windshield clear as shown in Figs. 1 and 2.

While I have described my invention in detail as to the mode of making and operation, it is to be understood that this has been by way of example only, and that other modifications or changes could be made without departing from the scope of the invention as falls within the purview of the following claims.

I claim:

1. A windshield wiping mechanism for use on a vehicle supplied with an air compressor comprising a bushing placed through the body wall of said vehicle, means for anchoring said bushing to said body wall, a hollow shaft rotatably positioned in said bushing and adapted for rotative movements by a wiper actuating unit provided on said vehicle, an air delivery line connecting the inner end of said hollow shaft and the air compressor, a hollow wiper arm connected to the outer end of said hollow shaft, a valve body at the upper end of said wiper arm, a windshield wiper blade connected to said valve body and disposed to move with said wiper arm and said hollow shaft and a valve in said valve body arranged to disperse air from said compressor unit in a diverging cone away from said wiper arm.

2. A windshield wiper mechanism for use on a vehicle provided with a wiper actuating mechanism and an air compressor, comprising a hollow shaft rotatably mounted through the shell of said vehicle beneath said windshield, an air conduit line having one end mounted to the inner end of said rotatable shaft and the opposite end affixed to the discharge line of said compressor, a hollow wiper arm having its lower end affixed to the outer end of said rotatable shaft, a valve body mounted on the other end of said arm, the hollow of said arm communicating with passageways in said hollow shaft and said air line, a wiper blade affixed to said valve body, means for connecting said rotatable shaft with said wiper actuating mechanism to move said blade across said windshield and valve means in said valve body for dispersing a stream of air delivered by said compressor outwardly from said wiper blade.

References Cited in the file of this patent

UNITED STATES PATENTS

| | | |
|---|---|---|
| 523,941 | North et al. | July 31, 1894 |
| 1,448,508 | Thum | Mar. 13, 1923 |
| 1,656,473 | Darlington | Jan. 17, 1928 |
| 2,582,717 | Pierce | Jan. 15, 1952 |

FOREIGN PATENTS

| | | |
|---|---|---|
| 567,861 | France | Dec. 13, 1923 |